3,328,185
POLYAMIDE-FILLER COMPOSITION
Eric S. Lind, Cambridge, and Donald I. Pierce, Reading, Mass., assignors to W. R. Grace & Co., Cambridge, Mass., a corporation of Connecticut
No Drawing. Filed Aug. 30, 1963, Ser. No. 305,826
4 Claims. (Cl. 106—243)

This invention relates to a polyamide composition containing a high percentage of filler.

Polyamides derived from polymeric fatty acids and polyamines are thermoplastic solids with relatively low melting points. They are substantially moisture impervious and are capable of forming strong bonds with a number of materials. These polymers have a low melt viscosity and may be rapidly applied in hot melt form to the surface to be bonded. They have been used extensively in such form as side seam cements in the fabrication of cans from tin-plated sheet metals.

More recently, these polyamides have been used in hot melt form as side seam cements in the manufacture of paper cans. However, the continued use of these polymers in paper cans is limited because they are too expensive in relationship to the properties needed.

Fillers in particulate form have been widely used to extend polymers and to modify their properties. Although the low melt viscosity of the instant polyamides facilitates the admixture of fillers, inclusion of fillers in these polymers presents certain problems. In hot melt applications, the polyamide is generally melted in a pot and used over a period of several hours. To form a uniform dispersion, the filler may be simply mechanically admixed with the molten polymer. Generally, these hot melt dispersions are unstable and the filler settles out while the dispersion is being applied. This interference with coating operations and causes erratic and non-reproducible results.

Dispersions with improved stability may be obtained by using finely divided particle size filler. Such filler, however, increases the viscosity of the dispersion significantly and prevents its rapid application in hot melt form.

It is a principal object of the present invention to provide a substantially stable hot melt dispersion comprised of the instant polyamide and a major amount of filler with a viscosity low enough for rapid hot melt application. According to the present invention, the filler particle is substantially spherical in form. The size of the particle may range from 1 to 50 microns in diameter with a mean diameter sufficiently large to produce a dispersion of the desired viscosity.

Briefly stated, the instant invention comprises a composition of 30 to 45 percent by weight of polyamide and 55 to 70 percent by weight of substantially spherical filler particles ranging from 1 to 50 microns in diameter, said particles having a mean diameter sufficiently large to produce a dispersion with a melt viscosity not greater than 11,000 cps. at 380° F.

The polyamide of the instant invention is of the type disclosed in the U.S. Patent No. 2,450,940 to Cowan et al. These polyamides are derived by condensing a polymeric fatty acid or a mixture of a polymeric fatty acid and a polycarboxylic acid with a polyamine. Examples of the polymeric fatty acids are those resulting from the polymerization of drying or semi-drying oils, or the free acids, or simple aliphatic alcohol esters thereof. Suitable drying or semi-drying oils include soybean, linseed, tung, perilla, oiticica, cottonseed, corn, tall, sunflower, safflower and dehydrated castor oil. In the polymerization process for the preparation of the polymeric fatty acids, the fatty acids with sufficient double bond functionality combine, for the most part, probably by a Diels-Alder mechanism, to provide a mixture of dibasic and higher polymeric acids. The acids with insufficient functionality to react remain as monomers and may be removed by distillation. The residue after distillation consists of the desired polymeric acids and this mixture is used for the preparation of polyamide resin. In the place of this method of polymerization, any other method of polymerization may be employed, whether the resultant polymer possesses residual unsaturation or not. The polymeric fat acids either by themselves or in admixture with other polybasic acids, particularly aliphatic and aromatic polybasic acids containing from 5 to 10 carbon atoms and in which the carboxyl groups are separated by at least 3 carbon atoms, such as glutaric, adipic, azelaic, sebacic and terephthalic acids, are converted to polyamides by reaction with a suitable polyamine, preferably aliphatic polyamines such as ethylene diamine, diethylene triamine and the like. Ordinarily polyamides of this type have molecular weights varying from 3,000 to 10,000 and are resistant to the corrosive action of water, alkali, acids, oils, greases, and organic solvents. The resins derived from ethylene diamine and polymeric fat acids alone have melting points in the range of 105–120° C. Those derived from polymeric fat acids and other polybasic acids melt at higher temperatures, frequently as high as 210° C.

To obtain a hot melt substantially stable dispersion according to the instant invention, the filler must be incorporated in the polyamide in amounts in excess of 50 percent by weight. Preferably, the filler is used in amounts ranging from 55 to 70 percent by weight. The amount of filler may be varied within this range depending on the viscosity desired. The incorporation of such large amounts of filler in the molten polymer produces a tightly packed dispersion which does not allow settling. Filler used in amounts lower than 50 percent by weight has a greater tendency to settle out whereas filler used in amounts greater than 70 percent by weight does not ordinarily produce an acceptable seal.

To allow rapid hot melt application, the melt viscosity of the dispersion of the instant invention should not be greater than 11,000 cps. as measured on a Brookfield Viscometer, Model LVT–5X, at 380° F. and 60 r.p.m. To produce a dispersion with the desired viscosity, a predominant amount of the filler particles should be substantially spherical in form. Filler particles in the form of platelets, rods or needles, when used in amounts in excess of 50 percent by weight, produce dispersions that are too viscous to be spread readily on the material to be coated.

Preferably, the substantially spherical filler particles of the instant invention range from about 1 to 50 microns in size as measured by electron microscopy. The mean diameter of the filler particles should be sufficiently large to produce a dispersion having a melt viscosity not greater than 11,000 cps. at 380° F. Filler particles having a mean diameter of about 14 microns or higher are generally suitable. Representatives of fillers available in such form and size is calcium carbonate and carbon black.

Dispersions containing filler particles larger than 50 microns in size cannot be used in conventional machinery because such large particles cannot pass through the nozzle applicator. In addition, dispersions of these large filler particles produce a seal which is too abrasive for paper cans.

Any conventional method may be used to mix the filler with the molten polyamide. The filler should be thoroughly dispersed in the molten polymer to provide a uniform dispersion.

The dispersion of the instant invention is capable of being extruded into rods which can be cut and allowed to solidify to form pellets. Because of their high filler content, the pellets are free-flowing and do not tackify readily. They are easily transported and present no handling problems.

Proportions used here and elsewhere herein refer to parts by weight.

This invention is further illustrated by the following examples:

Example I

A polyamide derived by condensing a mixture of polymerized linoleic acid and oleic acid with a mixture of polyamines having the following properties was used:

| Properties | Test | Minimum | Maximum |
|---|---|---|---|
| Melting Point | Ball & Ring Method—ASTM E28-58T. | 270° F. | 300° F. |
| Viscosity at 380° F. (Initial). | Viscosity measured on a Brookfield Viscometer, Model No. LVT-5X at 60 r.p.m. using a #2 spindle. | 300 cps. | 500 cps. |
| Viscosity at 380° F. (after 48 hours in stirred pot at 380° F.). | | None. | 1,000 cps. |

Calcium carbonate filler, substantially spherical in form with a minimum of 99 percent passing through 300 or 325 mesh screen and having a diameter ranging from 1 to 50 microns with a mean diameter of about 14 microns as measured by electron microscopy was used.

40 parts by weight of the polyamide was heated to 380° F. When all of the polyamide became molten, 60 parts by weight of the calcium carbonate was mechanically admixed with it until a uniform dispersion was obtained. The dispersion was placed in a number of containers and allowed to stand for several hours to determine its stability characteristics. After 72 hours, there was no observable settling out of the filler in any of the containers. Specific gravity determinations were made of both the lower and upper half layers of the dispersion in several of the containers. No apparent difference in results was noted.

Several properties of the dispersion were determined and the results were as follows:

Adhesion to vinyl coated aluminum foil ----- Very good
Viscosity at 380° F. (initial) (Viscosity measured on Brookfield Viscometer, Model No. LVT-5X at 60 r.p.m. using a No. 3 spindle) -------cps-- 4000
Viscosity stability (viscosity increased by 100 cps. over a 24 hr. period) ------------------ Good
Melting point (ball and ring method—ASTM E28-58T ---------------------------------° F-- 290
Creep temperature (temperature at which two strips of tin plate secured together by the dispersion end to end so that one square inch of surface of each strip is covered are separated by a 500 g. weight) ----------------------------° F-- 190
Oil resistance ---------------------------- Excellent
Specific gravity --------------------------- 1.53
Color ---------------------------------- Gray-white

Example II

The viscosity of the dispersion prepared in Example I was measured at several temperatures on a Brookfield Viscometer, Model No. LVT-5X, at 60 r.p.m. using a #3 spindle. The results were as follows:

| Temperature (° F.): | Viscosity (cps.) |
|---|---|
| 400 | 3600 |
| 390 | 3750 |
| 380 | 4150 |
| 370 | 4800 |
| 360 | 5500 |
| 350 | 6500 |
| 340 | 7500 |
| 330 | 8700 |

Example III

To determine the effect of various amounts of filler on the viscosity of the dispersion, additional dispersions of the polyamide and calcium carbonate filler used in Example I were formulated. The dispersions were prepared in the same manner as disclosed in Example I.

The viscosity was measured at 380° F. on a Brookfield Viscometer, Model No. LVT-5X, at 60 r.p.m. using a No. 3 spindle and the results were as follows:

| Calcium carbonate content of dispersion (Parts by weight): | Viscosity at 380° F. (cps.) |
|---|---|
| 60 | 3680 |
| 61 | 3800 |
| 62 | 4250 |
| 63 | 4800 |
| 64 | 5900 |
| 65 | 6300 |
| 70 | 11,000 |

Example IV

To determine degree and rate of settling, additional dispersions of the polyamide and calcium carbonate filler used in Example I were formulated. The dispersions were prepared in the same manner as disclosed in Example I.

Dispersion A was comprised of 60 parts by weight of polyamide and 40 parts by weight of calcium carbonate filler. Dispersion B was comprised of 80 parts by weight of polyamide and 20 parts by weight of calcium carbonate filler. Both dispersions were allowed to stand for several hours. After 12 hours, considerable settling out of the filler was observable in Dispersion B. After 24 hours, moderate settling out of the filler was observable in Dispersion A.

Several hot melt dispersions of the polyamide of Example I and a number of fillers of various shapes and sizes were prepared as disclosed in Example I. The composition of each dispersion and its characteristics are listed in the table below.

| Ex. | Composition ||||||| Characteristics |
|---|---|---|---|---|---|---|---|---|
| | Polyamide Parts by Wt. | Filler | Form | Parts by Wt. | Mesh Size | Particle Size | Other | |
| V | 50 | Calcium carbonate ("Whiting"). | Spherical | 25 | Minimum of 99% through 300 mesh. | 1 to 20 microns in diameter, mean diameter 5 microns. | | Viscosity determined at 380° F. and 60 r.p.m. on a Brookfield Viscometer, Model LVT-5X using a No. 4 spindle measured 14,000 cps. |
| VI | 60 | ----do---- | ----do---- | 20 | ----do---- | ----do---- | | Slightly less viscous than Example V. |
| VII | 45 | ----do---- | ----do---- | 45 | ----do---- | ----do---- | 10 parts by weight surfactant (Polymerized potassium salts of alkyl naphthalene sulfonic acids). | Too viscous for hot melt application. Surfactant does not decrease viscosity. |
| VIII | 60 | Calcium silicate | Platelet | 40 | 99% through 325 mesh. | Mean diameter 4.1 microns. | | Too viscous for hot melt application. |
| IX | 60 | Wood flour | Rod-like | 40 | 97% through 100 mesh, 78% through 200 mesh. | 15 to 25 microns in diameter, 35 microns in length. | | Do. |
| X | 30 | Calcium carbonate. | Spherical | 70 | Minimum of 99% through 300 or 325 mesh. | 1 to 50 microns in diameter, mean diameter 14 microns. | | Viscosity determined at 380° F. and 60 r.p.m. on a Brookfield Viscometer, Model LVT-5X using a No. 4 spindle measured 11,000 cps. |

The table illustrates that filler particles in the form of platelets or rods, or of a very finely divided spherical shape produce hot melt dispersions which are more viscous than that produced by substantially spherical filler particles of coarser size as illustrated by Example XII.

*Example XIII*

The effect of the size of substantially spherical filler particles on viscosity was determined.

Calcium carbonate filler particles, substantially spherical in form, of varying size were used. The polyamide was the same as that disclosed in Example I.

Filler A was comprised of particles 94 percent of which passed through 140 mesh screen and 80 percent of which passed through 200 mesh screen. Dispersion A was comprised of 40 parts by weight of the polyamide of Example I and 60 parts by weight of Filler A. The dispersion was formed as disclosed in Example I.

The initial viscosity of Dispersion A was determined at 380° F. and 60 r.p.m. on a Brookfield Viscometer, Model LVT-5X, using a No. 3 spindle and measured 2500 cps.

Filler B was comprised of precipitated calcium carbonate and was of a very finely divided size. Dispersion AB was comprised of 38 parts by weight of the polyamide, 57 parts by weight of Filler A and 5 parts by weight of Filler B. The initial viscosity of Dispersion AB was determined in the same manner as above and measured 3400 cps. at 380° F.

*Example XIV*

The dispersion prepared in Example I was passed through a plastograph extruder to form a rod. The rod was cut and the pieces allowed to solidify to form pellets.

The pellets were freely flowable. They were placed in a fibre drum of the type ordinarily used for transporting pelletized materials. The fibre drum was placed in a room maintained at 100° F. and 50 percent relative humidity. At the end of a week, the pellets were still freely flowable and non-blocking.

We claim:

1. A composition capable of forming a substantially stable hot melt dispersion comprised of 30 to 45 parts by weight of a polyamide derived by condensing an acid selected from the group consisting of a polymeric fatty acid and a mixture of a polymeric fatty acid and a polybasic acid in which the carboxyl groups are separated by at least 3 carbon atoms with a polyamine and 55 to 70 parts by weight of calcium carbonate particles having a spherical shape and a particle size ranging from about 1 to 50 microns in diameter, said particles having a mean diameter sufficiently large to produce a dispersion with a viscosity not greater than 11,000 cps. at 380° F.

2. The composition according to claim 1 wherein the mean diameter of the calcium carbonate particles is about 14 microns.

3. The composition according to claim 2 wherein 40 parts by weight of polyamide and 60 parts by weight of calcium carbonate are used and the viscosity is about 4000 cps. at 380° F.

4. A composition capable of forming a substantially stable hot melt dispersion comprised of 30 to 45 parts by weight of a polyamide derived by condensing an acid selected from the group consisting of a polymeric fatty acid and a mixture of a polymeric fatty acid and a polybasic acid in which the carboxylic groups are separated by at least three carbon atoms with a polyamine and 55 to 70 parts by weight of calcium carbonate particles having a spherical shape, said particles having a mean diameter sufficiently large to produce a dispersion with a viscosity not greater than 11,000 cps. at 380° F.

References Cited

UNITED STATES PATENTS

| 2,760,877 | 8/1956 | Castner | 106—243 XR |
| 2,768,090 | 10/1956 | Wittcoff et al. | 106—287 |
| 2,861,002 | 11/1958 | Britton | 106—287 XR |
| 2,899,289 | 8/1959 | High | 106—243 XR |

ALEXANDER H. BRODMERKEL, *Primary Examiner.*

J. B. EVANS, *Assistant Examiner.*